US012736628B2

(12) United States Patent
Chang

(10) Patent No.: US 12,736,628 B2
(45) Date of Patent: Sep. 15, 2026

(54) METHOD OF AUTOMATIC ZOOMING CONTROL, APPARATUS, ELECTRONIC DEVICE, AND COMPUTER READABLE STORAGE MEDIUM APPLYING THE METHOD

(71) Applicant: Rayprus Technology (Foshan) Co., Ltd., Foshan (CN)

(72) Inventor: Chih-Liang Chang, New Taipei (TW)

(73) Assignee: Rayprus Technology (Foshan) Co., Ltd., Foshan (CN)

(*) Notice: Subject to any disclaimer, the term of this patent is extended or adjusted under 35 U.S.C. 154(b) by 719 days.

(21) Appl. No.: 18/196,428

(22) Filed: May 11, 2023

(65) Prior Publication Data

US 2024/0230844 A1 Jul. 11, 2024

(30) Foreign Application Priority Data

Jan. 10, 2023 (CN) ......................... 202310033260.8

(51) Int. Cl.

| | |
|---|---|
| ***G01S 7/48*** | (2006.01) |
| ***G01S 7/481*** | (2006.01) |
| ***G01S 13/931*** | (2020.01) |
| ***G01S 17/08*** | (2006.01) |

(Continued)

(52) U.S. Cl.

CPC .......... *G01S 7/4808* (2013.01); *G01S 7/4816* (2013.01); *G01S 17/08* (2013.01); *G01S 17/42* (2013.01); *G01S 17/931* (2020.01); *G01S 2013/932* (2020.01)

(58) Field of Classification Search

None

See application file for complete search history.

(56) References Cited

U.S. PATENT DOCUMENTS

| | | | | |
|---|---|---|---|---|
| 5,752,214 A * | 5/1998 | Minowa | ............. | B60K 31/0008 701/111 |
| 6,182,000 B1 * | 1/2001 | Ohta | .................. | F16H 61/0213 701/55 |
| 2010/0020306 A1 | 1/2010 | Hall | | |

(Continued)

FOREIGN PATENT DOCUMENTS

| | | |
|---|---|---|
| CN | 107979724 A | 5/2018 |
| CN | 111796285 A | 10/2020 |

OTHER PUBLICATIONS

English Machine Translation of CN 111796285 A.*

*Primary Examiner* — Mohammed Jebari

(74) *Attorney, Agent, or Firm* — ScienBiziP, P.C.

(57) ABSTRACT

A method of automatic zoom control comprises acquires a speed of a moving device and a speed change signal. A detection distance required by the moving device after a specified time duration is predicted according to the speed of the moving device and the speed change signal. A target focal length of a zoom radar is calculated according to the predicated detection distance, and the focal length of the zoom radar is adjusted to be the target focal length over the specified time duration. The longer detection distance, the focal length will be larger for satisfying with a detecting requirement, a light intensity of the zoom laser does not increase for increasing the detection distance. An energy consumption and a generated heat of the laser radar to be reduced. An apparatus, an electronic device, and a computer readable storage medium applying the method are also disclosed.

18 Claims, 3 Drawing Sheets

(51) Int. Cl.
*G01S 17/42* (2006.01)
*G01S 17/931* (2020.01)

(56) References Cited

U.S. PATENT DOCUMENTS

| | | | | |
|---|---|---|---|---|
| 2012/0268608 | A1* | 10/2012 | Watanabe | H04N 23/695 348/169 |
| 2013/0083234 | A1* | 4/2013 | Shigeta | H04N 13/207 348/335 |
| 2013/0120618 | A1* | 5/2013 | Wang | H04N 23/69 348/240.99 |
| 2018/0115687 | A1 | 4/2018 | Yuen et al. | |
| 2018/0352144 | A1* | 12/2018 | Miao | G06T 7/73 |
| 2019/0017819 | A1* | 1/2019 | Ohara | H04N 23/81 |
| 2019/0349508 | A1* | 11/2019 | Kazami | G06T 7/50 |
| 2019/0353775 | A1* | 11/2019 | Kirsch | G01S 7/4004 |
| 2021/0109312 | A1* | 4/2021 | Honjo | G03B 15/006 |
| 2022/0108548 | A1 | 4/2022 | Kim et al. | |
| 2022/0343138 | A1 | 10/2022 | Tang et al. | |
| 2023/0132986 | A1* | 5/2023 | Tsunashima | G06T 7/70 348/345 |
| 2025/0184613 | A1* | 6/2025 | Wada | H04N 23/6811 |

* cited by examiner

METHOD OF AUTOMATIC ZOOMING CONTROL, APPARATUS, ELECTRONIC DEVICE, AND COMPUTER READABLE STORAGE MEDIUM APPLYING THE METHOD

FIELD

The subject matter herein generally relates to laser radar technology.

BACKGROUND

A laser radar on a vehicle is used for detecting environment surrounding the vehicle. The laser radar emits laser beam for scanning. The laser radar includes an area light source. The laser beam emitted by the area light source diffuses in a field of the laser radar. A diffusion degree of the laser beam is related with a detection distance of the laser radar. To increase the detection distance of the laser radar, a light intensity of the laser beam is correspondingly increased, which may result in increases in energy consumption and heat generated by the laser radar.

There is room for improvement in the art.

BRIEF DESCRIPTION OF THE DRAWINGS

Implementations of the present disclosure will now be described, by way of example only, with reference to the attached figures.

DETAILED DESCRIPTION

Figure 1:
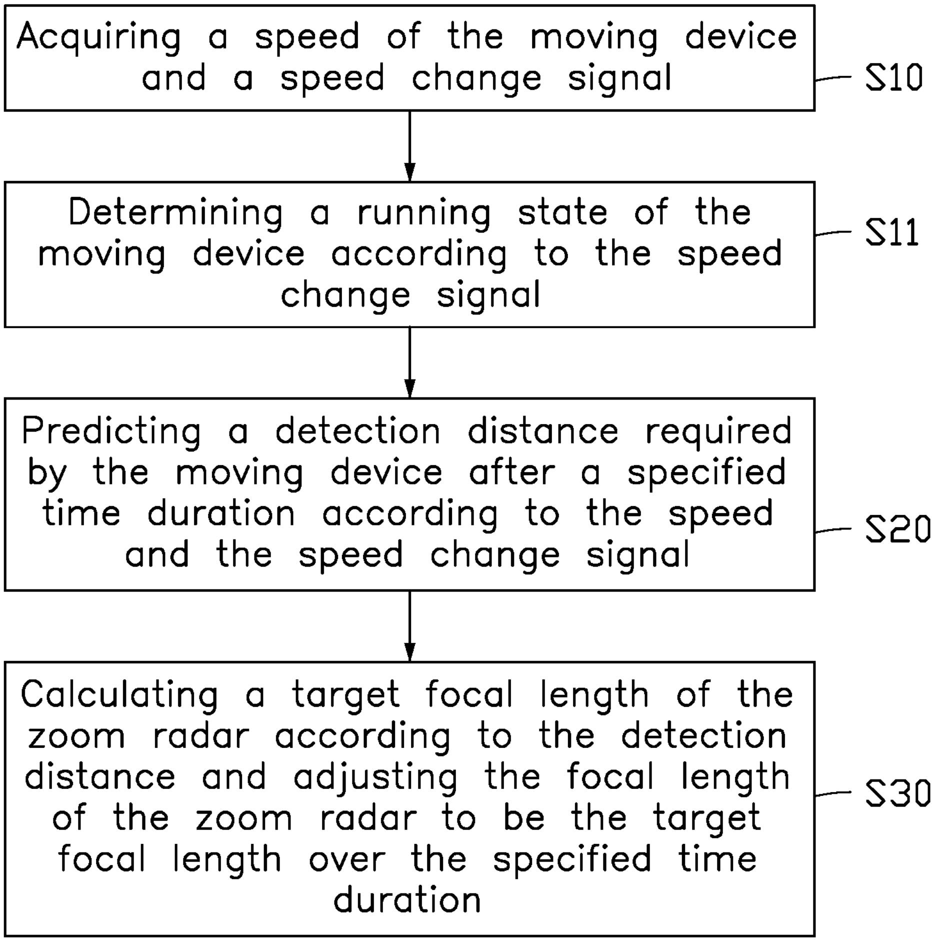
FIG. 1 is a flowchart illustrating an embodiment of a method of automatic zooming control according to the present disclosure.

The present disclosure is described with reference to accompanying drawings and the embodiments. It will be understood that the specific embodiments described herein are merely part of all embodiments, not all the embodiments. Based on the embodiments of the present disclosure, it is understandable to a person skilled in the art, any other embodiments obtained by persons skilled in the art without creative effort shall all fall into the scope of the present disclosure. It will be understood that the specific embodiments described herein are merely some embodiments and not all.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Terms "first", "second", and the like used in the specification, the claims, and the accompanying drawings of the present disclosure are used to distinguish different objects rather than describe a particular order. A term "comprise" and its variations are intended to cover a non-exclusive inclusion. For example, a process, method, system, product, or apparatus including a series of steps or units is not limited to the listed steps or units, and may optionally include other steps or units that are not listed, or other steps or units inherent to the process, method, product, or device.

It will be understood that, even though the flowchart shows a specific order, an order different from the specific order shown in the flowchart can be implemented. The method of the present disclosure can include one or more steps or actions for achieving the method. The steps or the actions in the method can be interchanged with one another without departing from the scope of the claims herein.

FIG. 1 shows a flowchart of the method of automatic zooming control. The method applied in a moving device with a controller and a zoom radar. The method implemented by the controller includes at least the following steps, which also may be re-ordered.

In block S10, a speed of the moving device and a speed change signal is acquired.

In one embodiment, the moving device can be any moving device with laser radars, such as a vehicle, an unmanned aerial vehicle (UAV), an aircraft, a robot, and the like.

While the moving device is a vehicle, the speed may be acquired from an electronic control unit (ECU) of the vehicle, also can be acquired from a speed sensor on the vehicle. During changing the speed of the vehicle, an accelerator pedal is pressed or released by a driver, and a signal of the accelerator pedal is generated and transmitted to an electronic accelerator for amplifying, the signal of the accelerator pedal also can be provided to the ECU directly for controlling the speed of the vehicle. Thus, the speed change signal may be acquired from the signal of the accelerator pedal or the signal of the electronic accelerator, and also may be acquired from the ECU. While the moving device is another device, the speed and the speed change signal may be acquired from other device or controller related to the speed of the moving device.

In block S20, a detection distance required by the moving device after a specified time duration is predicted according to the speed and the speed change signal.

In one embodiment, the speed change signal represents a speed change condition of the moving device. The speed change signal may include speed change data, such as a speed change value (for example, an accelerated speed value or a deceleration speed value), or a throttle opening of the accelerator.

In block S30, a target focal length of the zoom radar is calculated according to the detection distance and the focal length of the zoom radar is adjusted to be the target focal length over the specified time duration.

By adjusting the detection distance by the focal length of the zoom radar, the larger the focal length of the zoom radar, the longer detection distance will be, and a field of the zoom radar will be narrower. Otherwise, the smaller the focal length of the zoom radar, the smaller detection distance will be, and the field of the zoom radar will be wider.

In one embodiment, the method of automatic zooming control acquiring the speed of the moving device and the speed change signal; predicting the detection distance required by the moving device after a specified time duration according to the speed and the speed change signal; calculating the target focal length of the zoom radar according to the detection distance and adjusting the focal length of the zoom radar to be the target focal length over the specified time duration. Based on above, on the one hand, the focal length of the zoom radar is adjusted according to the detection distance required by the moving device. The longer detection distance, the focal length will be larger for satisfying with a detecting requirement of the zoom radar, thus a light intensity of the zoom laser does not increase for increasing the detection distance, an energy consumption and a generated heat of the laser radar to be reduced. On another hand, the detection distance required by the moving device after the specified time duration is predicated, and the target focal length is adjusted according to the predicated detection distance in the specified time, thus the focal length of the zoom radar is pre-controlled for satisfying with the detection distance required by the moving device after the predefined time duration. An accident caused by the less detection distance while the focal length of the zoom radar fails to be adjusted on time is avoided. A frequency of adjusting the focal length of the zoom radar while the speed of the moving device change is reduced, an environment image is hard to achieved by the zoom radar while adjusting the focal length of the zoom radar.

It is understood that in the embodiment "in the specified time duration" means the time nearly reached the specified time duration. For example, the specified time duration is 3 seconds, the time of adjusting the focal length to be the target focal length may be 2.7 seconds. The specified time duration and the time point for adjusting the focal length of the zoom radar can be set according to different requirements.

In one embodiment, after the block S10, the method includes the following steps.

In block S11, a running state of the moving device is determined according to the speed change signal. The running state may include a speed-up state and a slow-down state.

For example, while the moving device is a vehicle and the speed change signal is acquired from the signal of the accelerator pedal or the signal of the electronic accelerator, the running state of the moving device is determined according to the signal of the accelerator pedal or the signal of the electronic accelerator. If the accelerator pedal is pressed, the running state of the moving device is a speed-up state. If the speed change signal is acquired from the ECU, the speed data in the speed change signal is directly used for determining the running state of the moving device.

If the running state is determined to be the speed-up state, the specified time duration is set to be a first time duration by the moving device; if the running state is determined to be a slow-down state, the specified time duration is set to be a second time duration by the moving device, which is longer than the first time duration. In that mean, while the moving device is in the speed-up state, a speed of adjusting the focal length of the zoom radar is faster for reflecting the speed-up state of the moving device. While the moving device is in the slow-down state, the speed of adjusting the focal length of the zoom radar is slower for reflecting the slow-down state of the moving device.

While the moving device speeds up, the detection distance required by the zoom radar needs to be increased, and the focal length of the zoom radar needs to be adjusted for reflecting the speed change signal of the moving device. Thus, in the speed-up state, the detection distance required after the first time duration being shorter than the second time duration is predicated, and the focal length of the zoom radar is adjusted according to the predicated detection distance in the first time duration for quickly reflecting the speed change signal of the moving device.

While the moving device slows down, the actual focal length of the zoom radar satisfies with the detection distance required by the zoom radar. For avoiding adjusting the focal length frequently, the detection distance required after the second time duration being longer than the first time duration is predicated, and the focal length of the zoom radar is adjusted according to the predicated detection distance in the second time duration.

Figure 2:
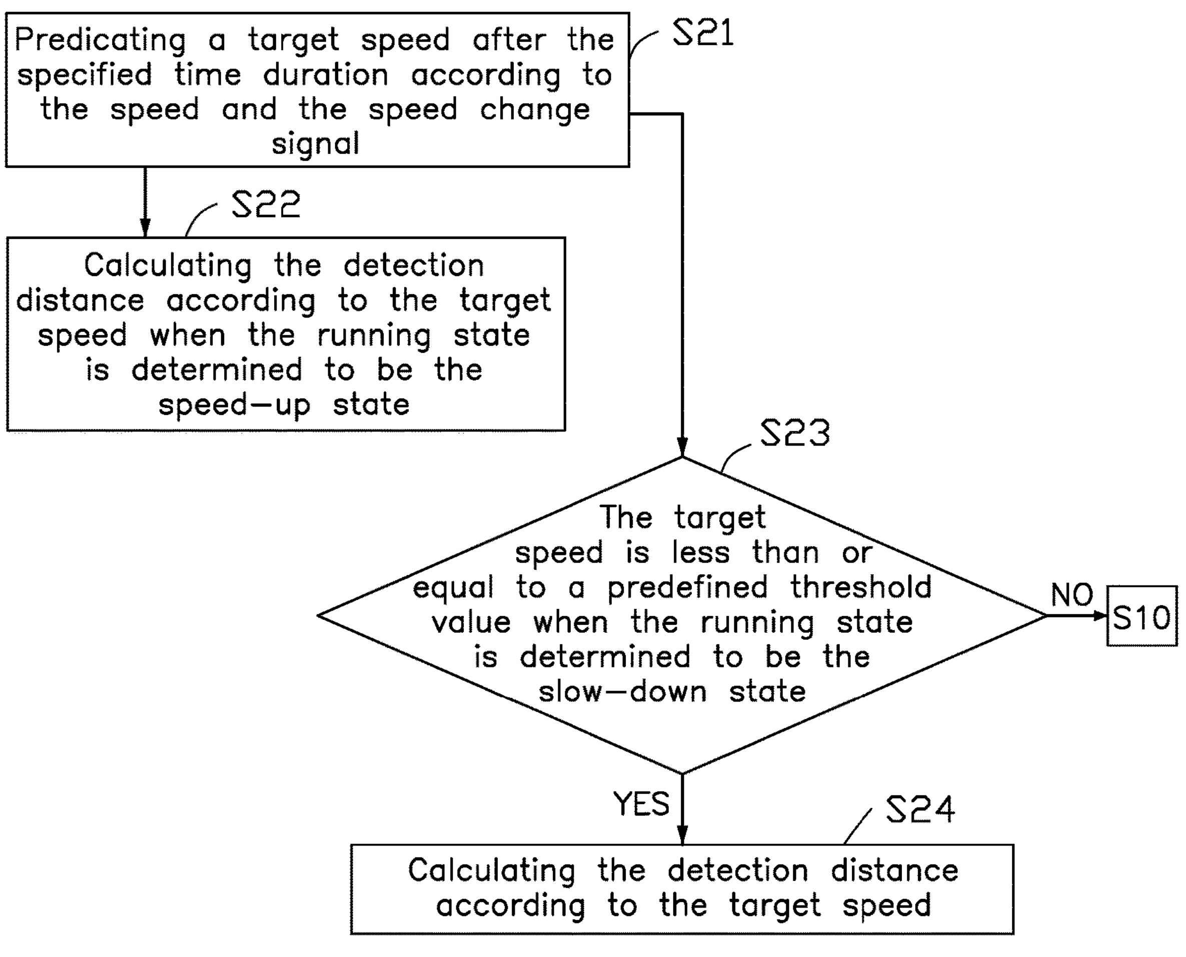
FIG. 2 is a detail flowchart illustrating an embodiment of the block S20 of the flowchart in FIG. 1 according to the present disclosure.

FIG. 2 shows a detail flowchart of the block S20. The block S20 further includes the following steps.

In block S21, a target speed after the specified time duration is predicted according to the speed and the speed change signal.

In block S22, the detection distance is calculated according to the target speed when the running state is determined to be the speed-up state.

In block S23, determining whether the target speed is less than or equal to a predefined threshold value when the running state is determined to be the slow-down state.

In block S24, the detection distance is calculated according to the target speed if the target speed is less than or equal to the predefined threshold value.

When the running state is determined to be the slow-down state and the target speed is larger than the predefined threshold value, the focal length of the zoom radar does not need to be adjusted, and the procedure returns to the block S10. If the target speed is less than or equal to the predefined threshold value, the focal length of the zoom radar needs to be adjusted.

The predefined threshold value is acquired according to the speed of the moving device. The speed of the moving device subtracts a slow-down threshold value as the predefined threshold value. The target speed is less than the difference between the moving speed and the slow-down threshold value. In that way, the difference between the moving speed and the target speed is larger than the slow-down threshold value. For example, the moving speed of the moving device is 100 km/h, the predefined threshold is 90 km/h, if the target speed after 5 seconds is 98 km/h, the focal length of the zoom radar does not need to be adjusted; if the target speed after 5 seconds is 90 km/h, the focal length of the zoom radar needs to be adjusted.

By setting the predefined threshold value in the slow-down state, a frequency of adjusting the focal length of the zoom radar is reduced.

Figure 3:
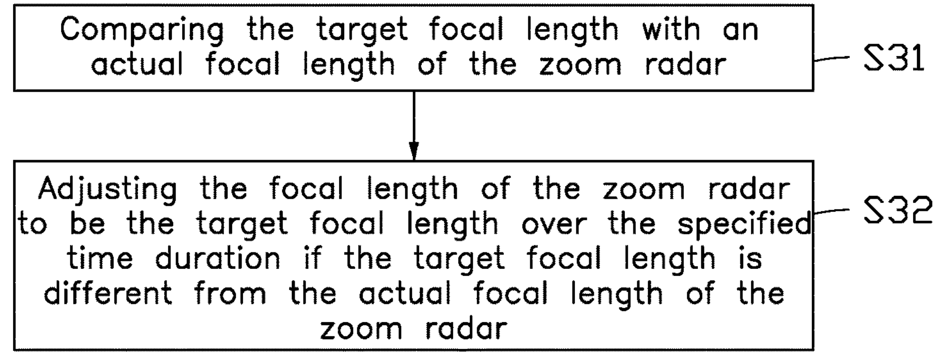
FIG. 3 is a detail flowchart illustrating an embodiment of the block S30 of the flowchart in FIG. 1 according to the present disclosure.

FIG. 3 shows a detail flowchart of the block S30. The block S30 further includes the following steps.

In block S31, the target focal length is compared with an actual focal length of the zoom radar.

In block S32, the focal length of the zoom radar is adjusted to be the target focal length over the specified time duration if the target focal length is different from the actual focal length of the zoom radar.

By comparing the target focal length and the actual focal length of the zoom radar, the adjusting operation is avoided if the target focal length is the same as the actual focal length of the zoom radar, thus a power dissipation is reduced.

Figure 4:
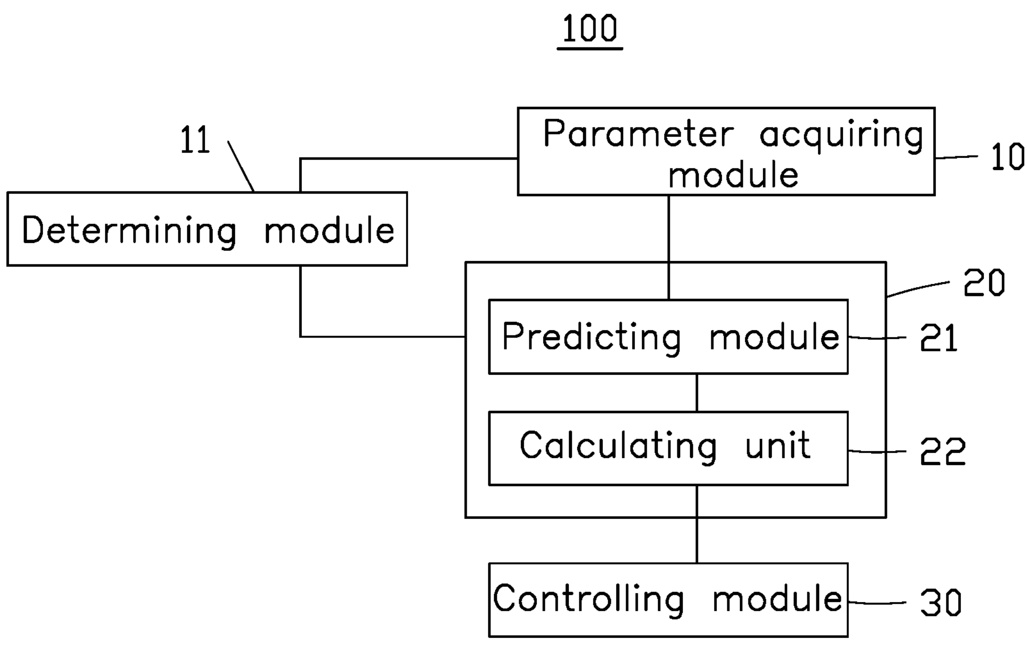
FIG. 4 is a diagram illustrating an embodiment of an apparatus according to the present disclosure.

FIG. 4 shows an apparatus 100 of automatic zooming control disposed in a moving device with a zoom radar. The apparatus 100 is configured to implement a method of automatic zoom control of the present disclosure.

Figure 5:
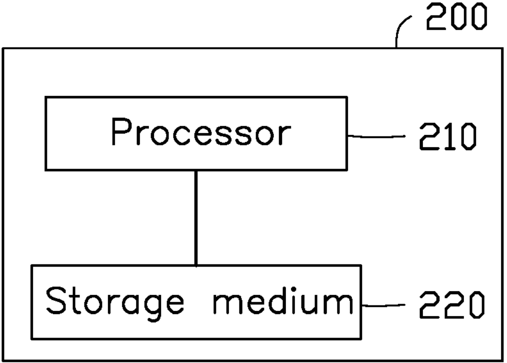
FIG. 5 is a diagram illustrating an embodiment of an electronic device according to the present disclosure.

As shown in FIG. 4, the apparatus 100 may include a parameter acquiring module 10, a calculating module 20, and a controlling module 30. In one embodiment, the modules can be stored in a storage medium 220 (as shown in FIG. 5) and can be run on the at least one processor 210 (as shown in FIG. 5). It should be understood that, in other embodiments, the modules can be instructions or firmware resident in the at least one processor 210.

The parameter acquiring module 10 is configured to acquire a speed of the moving device and a speed change signal.

While the moving device may be a vehicle, the parameter acquiring module 10 is communicated with an accelerator pedal, an electron accelerator, or an electronic control unit (ECU) of the vehicle for acquiring the speed and the speed change signal.

The calculating module 20 is electrically connected with the parameter acquiring module 10 and is configured to predict a detection distance required by the moving device after a specified time duration according to the speed and the speed change signal.

The controlling module 30 is electrically connected with the calculating module 20 and is configured to calculate a target focal length of the zoom radar according to the detection distance and adjust the focal length of the zoom radar to the target focal length over the specified time duration.

The apparatus 100 of the present disclosure may be a controller of the zoom radar, and also can be a device embedded in the controller of the zoom radar.

As shown in FIG. 4, the apparatus 100 may further include a determining module 11. The determining module 11 is electrically connected with the parameter acquiring module 10 and the calculating module 20. The determining module 11 is configured to determine a running state of the moving device according to the speed and the speed change signal. The running state may include a speed-up state and a slow-down state.

If the running state is determined to be the speed-up state determined by the determining module 11, the specified time duration is set to be a first time duration by the moving device. If the running state is determined to be the slow-down state determined by the determining module 11, the specified time duration is set to be a second time duration by the moving device.

As shown in FIG. 4, the calculating module 20 may include a predicting unit 21 and a calculating unit 22.

The predicting unit 21 is electrically connected with the parameter acquiring module 10 and the determining module 11. The predicting unit 21 is configured to predict a target speed of the moving device after the specified time duration according to the speed and the speed change signal.

The calculating unit 22 is electrically connected with the predicting unit 21 and is configured to calculate the detection distance according to the target speed when the running state is determined to be the speed-up state. The calculating unit 22 further is configured to determine whether the target speed is less than or equal to the predefined threshold value when the running state is determined to be the slow-down state. If the target speed is less than or equal to a predefined threshold value, the calculating unit 22 calculates the detection distance according to the target speed.

FIG. 5 shows an electronic device 200. The electronic device 200 may include a processor 210 and a storage medium 220. The processor 210 may execute computer programs or codes stored in the storage medium 220 to implement the foregoing method of automatic zooming control of the present disclosure.

In one embodiment, the storage medium 220 may include a non-volatile computer readable memory, such as a and a memory, and the like. It is understood that the storage medium 220 also may include other non-volatile computer readable memory, such as such as a plug-in hard disk, a Smart Media Card (SMC), a Secure Digital (SD) card, and a flash card, at lease one flash memory and/or other non-volatile solid-state storage device.

In one embodiment, the processor 210 may be, but not being limited, a central processing unit (CPU), and also can be other general processor, a digital signal processor (DSP), an application specific integrated circuit (ASIC), a field-programmable gate array (FPGA) or another programmable logic device, a discrete gate or transistor logic device, or a discrete hardware component. The processor 210 may implement or execute the foregoing method of automatic zoom control for adjusting the focal length of the zoom radar on the moving device.

The present disclosure also provides a computer readable storage medium. The computer readable storage medium stores computer programs or codes, when being executed to perform the foregoing method of automatic zoom control.

It should be noted that, for brevity, the above method embodiments are represented as a series of actions. But persons skilled in the art should appreciate that the present application is not limited to the order of the described actions, because according to the present application, some steps may be performed in other orders or performed simultaneously.

In the several embodiments provided in the application, it should be understood that the disclosed apparatus and method may be implemented in other manners. For example, the described apparatus embodiment is merely exemplary. For example, the division of the modules or units is merely logical function division and may be other division in actual implementation. For example, multiple units or components may be combined or integrated in another system, or some features may be ignored or not be executed. Furthermore, the displayed or discussed mutual couplings or direct couplings or communication connections may be implemented through some interfaces. The indirect couplings or communication connections between the apparatuses or units may be implemented in electrical, mechanical, or other forms. The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application. It may be clearly understood by a person skilled in the art that, for convenient and brief description, for a detailed working process of the foregoing apparatus and unit, refer to a corresponding process in the foregoing method embodiments, and details are not described herein again.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method of automatic zooming control, applicable in an apparatus disposed in a moving device; the apparatus comprises a storage medium with computer programs and a processor; the processor executes the computer programs to implement following processes:

acquiring a speed of the moving device and a speed change signal;

determining a running state of the moving device according to the speed change signal; wherein the running state comprises a speed-up state and a slow-down state;

predicating a target speed after the specified time duration according to the speed and the speed change signal;

in response to that the running state is determined to be the slow-down state, determining whether the target speed is less than or equal to a predefined threshold value;

in response to that the target speed is less than or equal to a predefined threshold value, calculating a detection distance after the specified time duration according to the target speed; and calculating a target focal length of a zoom radar according to the detection distance and adjusting a focal length of the zoom radar to be the target focal length over the specified time duration.

2. The method of claim 1, wherein before the predicating a target speed after the specified time duration according to the speed and the speed change signal, the method further comprises:

in response to that the running state is determined to be the speed-up state, setting the specified time duration to be a first time duration by the moving device; and before the predicating a target speed after the specified time duration according to the speed and the speed change signal, the method further comprises:

in response to that the running state is determined to be the slow-down state, setting the specified time duration to be a second time duration by the moving device, which is longer than the first time duration.

3. The method of claim 2, wherein the method further comprises:

in response to that the running state is determined to be the speed-up state, calculating the detection distance according to the target speed.

4. The method of claim 1, wherein calculating the target focal length of the zoom radar according to the detection distance and adjusting the focal length of the zoom radar to be the target focal length over the specified time duration further comprises:

comparing the target focal length with an actual focal length of the zoom radar; and adjusting the focal length of the zoom radar to be the target focal length over the specified time duration in response to that the target focal length is different from the actual focal length of the zoom radar.

5. The method of claim 1, wherein the moving device is a vehicle; the speed change signal is acquired from an electronic control unit of the vehicle, a signal of an accelerator pedal, or a signal of an electronic accelerator.

6. An apparatus disposed in a moving device with a zoom radar; the apparatus comprises a storage medium and at least one processor; the storage medium stores at least one command; the at least one commands is implemented by the at least one processor to execute functions; the storage medium comprising:

a parameter acquiring module, configured to acquire a speed of the moving device and a speed change signal;

a determining module, electrically connected with the parameter acquiring module, and configured to determine a running state of the moving device according to the speed change signal; wherein the running state comprises a speed-up state and a slow-down state;

a calculating module, electrically connected with the parameter acquiring module and configured to calculate a detection distance required by the moving device after a specified time duration according to the speed and the speed change signal; and a controlling module electrically connected with the calculating module and configured to calculate a target focal length of a zoom radar according to the detection distance and adjust a focal length of the zoom radar to the target focal length over the specified time duration;

wherein the calculating module comprises a predicting unit and a calculating unit; the predicting unit is electrically connected with the parameter acquiring module and the determining module, and is configured to predict a target speed of the moving device after the specified time duration according to the speed; the calculating unit is electrically connected with the predicting unit, and is configured to determine whether the target speed is less than or equal to the predefined threshold value in response to that the running state is determined to be the slow-down state; in response to that the target speed is less than or equal to the predefined threshold value, the calculating unit is further configured to calculate the detection distance according to the target speed.

7. The apparatus of claim 6, wherein the apparatus further comprises:

in response to that the running state is determined to be the speed-up state, setting the specified time duration to be a first time duration by the moving device; and in response to that the running state is determined to be the slow-down state, setting the specified time duration to be a second time duration by the moving device, which is longer than the first time duration.

8. The apparatus of claim 7, wherein the calculating unit is further configured to calculate the detection distance according to the target speed in response to that the running state is determined to be the speed-up state.

9. An electronic device comprises:

a storage medium; and a processor, wherein the storage medium stores computer programs, and the processor executes the computer programs to implement the following processes:

acquiring a speed of the moving device and a speed change signal;

determining a running state of the moving device according to the speed change signal; wherein the running state comprises a speed-up state and a slow-down state;

predicating a target speed after the specified time duration according to the speed and the speed change signal;

in response to that the running state is determined to be the slow-down state, determining whether the target speed is less than or equal to a predefined threshold value;

in response to that the target speed is less than or equal to a predefined threshold value, calculating a detection distance after the specified time duration according to the target speed; and calculating a target focal length of a zoom radar according to the detection distance and adjusting a focal length of the zoom radar to be the target focal length over the specified time duration.

10. The electronic device of claim 9, wherein the processor further:

in response to that the running state is determined to be the speed-up state, setting the specified time duration to be a first time duration by the moving device; and in response to that the running state is determined to be the slow-down state, setting the specified time duration to be a second time duration by the moving device, which is longer than the first time duration.

11. The electronic device of claim 10, wherein the processor further:

calculating the detection distance according to the target speed when the running state is determined to be the speed-up state.

12. The electronic device of claim 9, wherein the processor further comprises:

comparing the target focal length with an actual focal length of the zoom radar; and adjusting the focal length of the zoom radar to be the target focal length over the specified time duration if the target focal length is different from the actual focal length of the zoom radar.

13. The electronic device of claim 9, wherein the moving device is a vehicle; the speed change signal is acquired from an electronic control unit of the vehicle, a signal of an accelerator pedal, or a signal of an electronic accelerator.

14. A non-transitory computer readable storage medium, the non-transitory computer readable storage medium stores computer programs, and the computer programs are executed by at least one processor to implement following steps:

acquiring a speed of the moving device and a speed change signal;

determining a running state of the moving device according to the speed change signal; wherein the running state comprises a speed-up state and a slow-down state;

predicating a target speed after the specified time duration according to the speed and the speed change signal;

in response to that the running state is determined to be the slow-down state, determining whether the target speed is less than or equal to a predefined threshold value;

in response to that the target speed is less than or equal to a predefined threshold value, calculating a detection distance after the specified time duration according to the target speed; and calculating a target focal length of a zoom radar according to the detection distance and adjusting a focal length of the zoom radar to be the target focal length over the specified time duration.

15. The non-transitory computer readable storage medium of claim 14, wherein the processor further:

in response to that the running state is determined to be the speed-up state, setting the specified time duration to be a first time duration by the moving device; and in response to that the running state is determined to be the slow-down state, setting the specified time duration to be a second time duration by the moving device, which is longer than the first time duration.

16. The non-transitory computer readable storage medium of claim 14, wherein the processor further comprises:

calculating the detection distance according to the target speed when the running state is determined to be the speed-up state.

17. The non-transitory computer readable storage medium of claim 14, wherein the processor further comprises:

comparing the target focal length with an actual focal length of the zoom radar; and adjusting the focal length of the zoom radar to be the target focal length over the specified time duration if the target focal length is different from the actual focal length of the zoom radar.

18. The non-transitory computer readable storage medium of claim 14, wherein the moving device is a vehicle; the speed change signal is acquired from an electronic control unit of the vehicle, a signal of an accelerator pedal, or a signal of an electronic accelerator.

* * * * *